United States Patent Office 3,441,435
Patented Apr. 29, 1969

3,441,435
PROCESS AND COMPOSITION FOR IMPARTING ANTISTATIC FINISH TO TEXTILE MATERIALS
Helmut Kirschnek and Wolfgang Lehmann, Leverkusen, and Mathieu Quaedvlieg, Opladen, Germany, assignors to Farbenfabriken Bayer Aktiengesellschaft, Leverkusen, Germany, a German corporation
No Drawing. Filed Mar. 15, 1965, Ser. No. 439,995
Claims priority, application Germany, Apr. 8, 1964, F 42,554
Int. Cl. C08g 20/30; D06m 15/60
U.S. Cl. 117—139.5      8 Claims

ABSTRACT OF THE DISCLOSURE

Composition of matter and process for imparting an antistatic finish to fibrous materials by impregnating with an aqueous solution having as active component the polyaddition product of
(a) A diamine or polyamine having at least two hydrogen atoms with
(b) A polyglycidyl ether, and drying the impregnated material.

---

The present invention relates to a process for imparting an antistatic finish on fibrous materials; more particularly it concerns a process which consists in that the fibrous materials are impregnated with aqueous solutions of polyaddition products which are capable of self-cross-linking and are formed from di- or polyamides containing at least 2 reactive hydrogen atoms and from polyglycidyl ethers of the formula

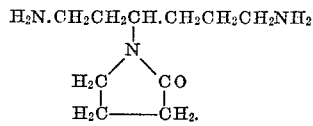

in which X denotes an at least bivalent organic radical, preferably a radical of polyhydric alcohols such as glycol, glycerol, trimethylol-propane, penta-erythritol or sorbitol, Y denotes hydrogen or a lower alkyl radical, and Z stands for hydrogen, the hydroxyl group or an organic or inorganic radical, for example, for an aliphatic, cycloaliphatic or heterocyclic hydrocarbon radical, for the radical of a fatty alcohol, a polyalkylene glycol ether, a fatty acid, a fatty acid amide, polyamine, polyimine, monoalkylamine or dialkylamine, a quaternary ammonium group or a silicone, for halogen or for the groups —COOH, and NH$_2$, but preferably for the radical of a dialkylamine whose alkyl groups contain 8 to 20 carbon atoms, while $m$ is an integer of 2 to 6, $n$ is an integer of 0 to 4, and $p$ and $r$, independently of one another, denote an integer of 1 to 100, whereupon the materials are subsequently dried.

Examples of di- or polyamines which contain at least two reactive hydrogen atoms and upon which the polyaddition products to be used according to the invention may be based, are: ethylene-diamine, tetramethylene-diamine, hexamethylene-diamine, diethylene-triamine, tetraethylene-pentamine, pentaethylene-hexamine, dipropylene-triamine, bis-(γ-aminopropyl) - methylamine, bis - (γ-aminopropyl)-dodecylamine, bis(γ-aminopropyl)-octadecylamine,bis - (γ - aminopropyl)-piperazine, N,N'-bis-(β-hydroxyethyl)-ethylene-diamine, N-β-cyanoethylethylene-diamine, N,N'-bis-(β-cyanoethyl)-ethylene-diamine, N-β-carbamidoethyl-ethylene-diamine, γ,γ' - diaminopropyl ether, ethyleneglycol-ω-ω'-diaminopropyl ether, n-butyl-eneglycol-ω-ω'-diaminopropyl ether, and N-(1,6-hexane diamine)-3-pyrrolidone of the formula

H$_2$N.CH$_2$CH$_2$CH.CH$_2$CH$_2$CH$_2$NH$_2$

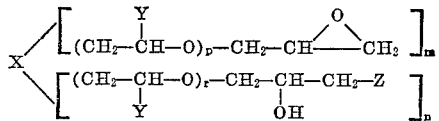

Polyglycidyl ethers of the general formula given above are, for example, the compounds which are obtained, when alkylene oxides, such as ethylene oxide, propylene oxide or butylene oxide are caused to act on polyhydric alcohols, such as glycol, glycerol, trimethylol-propane, penta-erythritol or sorbitol, the products are reacted with epichlorohydrin, the hydrogen chloride is split off from the reaction products, and, if desired, a radical corresponding to the symbol Z is introduced into the resultant polyglycidyl ethers in known manner, for example, a dialkylamine radical is introduced by the reaction of a glycidyl group with a dialkyl amine.

The solutions of the polyaddition products, which are to be used according to the invention, are advantageously prepared by causing the components concerned to react with one another in water or organic solvents, such as methanol, ethanol, isopropanol and ethylene glycol monomethyl ether, possibly with the concurrent use of emulsifiers, at a temperature of 20–50° C.; it is expedient to start the reaction at a concentration of about 40%, to continue it after a viscosity of 50–100 cp. has been reached, while reducing the concentration to about 25–15%, and then to interrupt it by adjusting the pH value of the weakly alkaline reaction solution with organic or inorganic acids to about 2–7 and, possibly, by further dilution, when a 25% solution adjusted to pH 2–7 has a viscosity of 20 to 300 cp. at 25° C., or when a 20% solution adjusted to a pH 2–7 has a viscosity of 10 to 300 cp., or when a 15% solution adjusted to a pH 2–7 has a viscosity of 5–300 cp. The proportion between the amine component and the polyglycidyl ether component should expediently be chosen in such a manner that 0.3 to 3, preferably 0.7 to 1.3, glycidyl groups are present for every reactive hydrogen atom of the amine component, in order to ensure that the polyaddition products to be used are capable of self-cross-linking. Before being used, the solutions of the polyaddition products thus prepared have also to be diluted with water dependent upon the impregnation method preferred.

Impregnation of the fibre materials with the solutions according to the invention can be carried out in different ways, for example on the foulard, by the extraction process, or by spraying. If, in the production of the polyaddition products, the pH value of the viscous solutions has been adjusted to pH 2–7 by means of inorganic acids, it is advisable to adjust the diluted solutions, before using them, to a pH value of 8–11 by means of sodium bicarbonate, sodium carbonate or a sodium hydroxide solution. The pH value of 4–7 which results if organic acids are used in the preparation of the polyaddition products for interrupting the reaction, can be retained; this is of advantage in some cases, for example, for treating fibre materials or dyeings which are sensitive to alkalies. The necessary amounts of suitable polyaddition products can easily be determined for each case by preliminary experiments. In general, it will be sufficient to apply to the fibrous material such an amount of polyaddition products as to bring about a weight increase of the material ranging from 0.5 to 10%, preferably from 1 to 3%. If desired, it is possible to add to the aqueous solution serving for the antistatic finish, other adjuvants which are suitable for the treatment of fibrous materials, such as sizing agents, plasticisers, hydrophobing agents, and dyestuffs or pigments.

The impregnated fibrous materials can be dried at room temperature or also at an elevated temperature. If the drying is carried out at 60–140° C., a period of 10–0.5 minutes is sufficient, and if drying is effected at room temperature, it is generally advisable to store the material for 1 to 3 days.

The antistatic finish achieved by the process according to the invention on, for example, fibers, threads or fabrics of wool, cellulose triacetates, synthetic polyamides, polyesters, polyacrylonitrile, and polypropylene are outstandingly stable to washing with conventional household detergents or to dry-cleaning with customary organic solvents. If in the above-mentioned formula of the polyglycidyl ether component Z stands for a hydrophilic group, e.g. for the hydroxyl group or the radical of a polyalkylene glycol ether, polyamine, polyimine or quaternary ammonium group, then fibrous materials of synthetic origin are simultaneously provided with a hydorphilic finish; if Z stands for a hydrophobic group, e.g. of the radical of a N,N-distearylamine or a silicone, then the fibrous materials are simultaneously rendered hydrophobic, whereas if Z stands for a higher alkyl radical, e.g. the stearyl radical, or for a group containing such a radical, e.g. a stearyl-trimethyl ammonium group, a plasticising effect is simultaneously achieved. It is noteworthy that fabrics which have been treated acording to the invention or prepared from fibres or threads treated according to the invention exhibit no disadvantageous stiffening.

It is already known to provide fibrous materials with an antistatic finish by impregnating them with aqueous solutions which contain di- or polyamines and polyglycidyl ethers in admixture with one another, and by hardening the impregnations after drying. The process of the present invention is superior to this method in that a one-substance product is used instead of a mixture of two differnt products, that it can be carried out without the occurrence of inconvenient odours caused by free amines, and that hardening of the impregnations after drying becomes unnecessary.

The following examples serve to illustrate the invention without, however, limiting its scope.

Example 1

Undyed or dyed fabrics made of threads which have been produced from polyacrylonitrile, polyester or synthetic polyamide fibres, are impregnated on a foulard with an aqueous liquor which contains, per litre, 130 g. of the 15% solution described below and has a pH value of 5. The impregnated fabrics are squeezed or centrifuged until the weight increase is about 100%, and then dried on a stenter in the course of 2 minutes by means of an air current at 120° C. The fabrics thus treated exhibit an outstanding antistatic effect which is maintained even after repeated washing with conventional household detergents in a washing machine, or after repeated dry-cleaning with the usual organic solvents at the temperatures customary for synthetic fibres.

If desired, 1.5 g. of a cation-active plasticiser, e.g., a condensation product of a fatty acid and diethylene triamine, may be added to the liquor per litre; in this way, the feel of the fabrics can be improved without impairing the antistatic effect or its stability to washing.

The 15% solution employed is prepared as follows: 1 mol trimethylol-propane are reacted with 25 mol ethylene oxide, the ethoxylation product obtained is then caused to react with 3 mol α-epichlorohydrin and the resultant chlorohydrin compound converted into the corresponding polyglycidyl ether by splitting off hydrogen chloride. 595 grams of the polyglycidyl ether thus obtained, which has an epoxide equivalent of 595, are dissolved in 595 ml. water, and a solution of 27 g. hexamethylene-diamine (0.233 mol) in 200 ml. water is introduced into this solution at 25° C. in the course of 30 minutes, while stirring and cooling. The reaction mixture is then kept at 25° C., while stirring, until the viscosity of the solution has increased to 50 cp.; this is the case about 40 minutes after the addition of the hexamethylene diamine solution is terminated. There are then added 600 ml. water, whereby the viscosity is reduced to about 20 cp. at 25° C. When the viscosity again reaches a value of 50 cp. at 25° C., i.e. after about 45 minutes, a further amount of 600 ml. water is added whereby the viscosity is reduced to about 30 cp. at 25° C. When the viscosity again rises to about 50 cp. at 25° C., i.e. after about 15 minutes, 600 ml. water are again added, whereby the viscosity is reduced to 35 cp. at 25° C., and when, after a further 10 minutes, the viscosity has again risen to 50 cp. at 25° C., a further 600 ml. water are finally added, wherby the viscosity is reduced to about 40 cp. at 25° C. The reaction is continued until the viscosity amounts to 100 cp. at 25° C. The reaction is then interrupted by the addition of 36 g. glacial acetic acid and 293 ml. water. The 15% solution thus prepared has a pH value of 5 and a viscosity of 92 cp. at 25° C.

An outstanding antistatic finish which is stable to washing is also obtained when the fabrics are treated, in the stated manner, with a liquor containing per litre, instead of 130 g. of the 15% solution mentioned above, 130 g. of those 15% solutions which are prepared in the manner stated above with the use of 17.5 g. ethylene-diamine (80%), 20.5 g. tetramethylene-tetramine, or 34 g. γ,γ'-diaminopropyl methylamine, instead of with 27 g. hexamethylene diamine.

Example 2

The operation is carried out as described in Example 1, but with the difference that the aqueous liquor contains, per litre, instead of 130 g. of the 15% solution there indicated, 130 g. of the 15% solution described below. The fabrics thus treated have also a very good antistatic finish of outstanding stability to washing.

The 15% solution employed is prepared as follows: 595 g. of the polyglycidyl ether described in Example 1 are dissolved in 595 ml. water, and a solution of 29 g. hexamethylene-diamine (0.25 mol) in 220 ml. water is introduced into this solution at 25° C. in the course of 30 minutes, while stirring and cooling. The reaction mixture is subsequently kept at 25° C., while stirring, until the initial viscosity of 15 cp. has risen to 250 cp.; this is the case after about one hour. The reaction is then interrupted by the addition of 48 g. adipic acid and 2692 ml. water. The 15% solution thus obtained has a viscosity of 20 cp. at 25° C. and a pH value of 6.

Example 3

The process is carried out as described in Example 1, but with the difference that, instead of the liquid there mentioned, a liquor is used which contains, per litre, 200 g. of the 10% solution described below. The fabrics thus treated exhibit an outstanding antistatic effect which is stable to repeated washing, and they also have a softer feel than the untreated fabrics.

The 10% solution employed is prepared as follows: 123 g. of a polyglycidyl ether which is produced from 1 mol trimethylol-propane, 25 mol ethylene oxide, 3 mol epichlorohydrin and 0.8 mol N-distearylamine and has an epoxy equivalent of 1230, is dissolved in a mixture of 100 g. methanol and 15 g. water, at 50° C., and treated in the course of 5 minutes, with a solution prepared from 2.9 g. hexamethylene-diamine (0.025 mol) and 30 ml. water. The reaction mixture is then further heated at 50° C. until it has attained a viscosity of about 100 cp. The reaction mixture is then treated in one portion with a solution of 34 g. glacial acetic acid in 988 ml. water, at 50° C. and immediately cooled to 20° C.

Example 4

Skeins of yarns produced from polyacrylonitrile, polyester, synthetic polyamide fibres, or from other synthetic materials are introduced, after conventional dyeing at a liquor-to-goods ratio of 40:1 and at a temperature of 40° C., into an aqueous bath containing, per litre, 0.2 g. anhydrous sodium carbonate and 5 g. of the 15% solution described below. The bath is then heated to 85–90° C. within 20 minutes and then maintained at this temperature for a further 30 minutes. The bath is then cooled to about 30° C. in the usual manner by addition of water, the skein material is centrifuged and finally dried at about 60° C. in a drying cabinet. The material thus treated has an outstanding antistatic finish. The finish is retained, even after repeated washing with conventional household detergents or repeated dry-cleaning with customary organic solvents. If desired, 1.5 g. of a cation-active plasticiser, e.g. of a condensation product of a fatty acid and diethylene triamine may be added to the liquor; an improved feel of the treated material is thus achieved without impairing the antistatic effect or its resistance to washing.

The 15% solution employed is prepared as follows: a solution of 116 g. hexamethylene diamine (1 mol) in 580 ml. water is introduced within 30 minutes, while stirring and cooling, into a solution at 25° C. prepared from 2380 g. of the polyglycidyl ether with the epoxide equivalent of 595 described in Example 1, and 2380 ml. water. The reaction mixture is then treated four times in the manner described in Example 1 with 2200 ml. water each time until its viscosity has increased to about 90 cp. at 25° C. 210 grams hydrochloric acid of 23° Bé and 2160 ml. water are then added to the reaction solution. The 15% solution thus prepared has a viscosity of 16 cp. at 25° C. and a pH value of 4.

We claim:
1. A process for imparting an antistatic finish to fibrous materials comprising
   (1) treating the fibrous materials with an aqueous solution containing, as active component, a cross-linkable polyaddition product of
      (A) a polyamine containing at least two reactive hydrogen atoms with a reactive amount of
      (B) a polyglycidyl ether of the formula

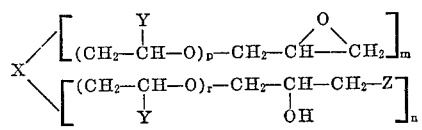

in which
   X is a radical of a 3–6 valent alcohol;
   Y is a member selected from the group consisting of hydrogen and lower alkyl;
   Z is a member selected from the group consisting of hydrogen, halogen, —COOH, —NH$_2$, hydroxyl, fatty alcohol moiety, polyalkylene glycol ether, fatty acid, fatty acid amide, polyamine, polyimine, monoalkylamine, dialkylamine, and quaternary ammonium group;
   $m$ is an integer of 2–6;
   $n$ is an integer of 0–4;
   the sum of $n$ and $m$ being at least 3;
   $p$ and $r$ are independently defined as integers of 1–100, the ratio of (B) to (A) components providing .3–3 glycidyl groups for each reactive amine hydrogen atom; and
   (2) drying the treated materials.

2. The process of claim 1, wherein the fibrous materials are treated with an aqueous solution of a polyaddition product capable of self-cross-linking, the preparation of said polyaddition product being effected in the presence of organic acids used for interrupting the reaction of the (A) amine component with the polyglycidyl ethers, the aqueous solution having a pH value between 4 and 7.

3. The process of claim 1 wherein the (A) amine component is a member selected from the group consisting of ethylene-diamine, tetramethylene-diamine, hexamethylene-diamine, diethylene-triamine, tetraethylene-pentamine, pentaethylene - hexamine, dipropylene - triamine, bis-(γ-aminopropyl)-methylamine, bis-(γ-aminopropyl)-dodecylamine, bis - (γ-aminopropyl) - octadecylamine, bis - (γ-aminopropyl)-piperazine, N,N' - (β-hydroxyethyl)-ethylene-diamino, N-β-cyanoethylethylene-diamine, N,N'-bis-β-(cyanoethyl)-ethylene-diamine, N-β - carbamidoethyl-ethylene-diamine, γ,γ'-diaminopropyl ether, ethyleneglycol-ω,ω'-diaminopropyl ether, n-butyleneglycol - ω,ω' - diaminopropyl ether, and

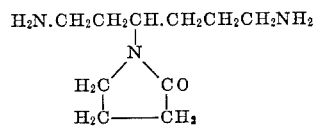

4. The process of claim 1 wherein the impregnated fibrous materials effect a weight increase of about .5–10%.

5. The process of claim 1 comprising treating the materials on the foulard and drying at about room temperature up to 140° C.

6. The process of claim 1, comprising treating the materials by an extraction process and drying at about room temperature up to 140° C.

7. The process of claim 1, comprising treating the materials by spraying and drying at about room temperature up to 140° C.

8. A composition of matter consisting essentially of water and about 10–15% by weight of the polyaddition product of
   (A) a polyamine containing at least two reactive hydrogen atoms with a reactive amount of
   (B) a polyglycidyl ether of the formula

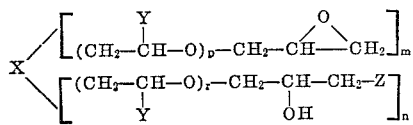

in which
   X is a radial of a 3–6 valent alcohol;
   Y is a member selected from the group consisting of hydrogen and lower alkyl;
   Z is a member selected from the group consisting of hydrogen, halogen, —COOH, —NH$_2$, hydroxyl, fatty alcohol moiety, polyalkylene glycol ether, fatty acid, fatty acid amide, polyamine, polyimine, monoalkylamine, dialkylamine, and quaternary ammonium group;
   $m$ is an integer of 2–6;
   $n$ is an integer of 0–4;
   the sum of $n$ and $m$ being at least 3;
   $p$ and $r$ are independently defined as integers of 1–100, the ratio of (B) to (A) components providing .3–3 glycidyl groups for each reactive amine hydrogen atom.

References Cited
UNITED STATES PATENTS 3,154,429  10/1964  Albrecht et al.
3,108,011  10/1963  Frotscher _____ 117—161 X WILLIAM D. MARTIN, *Primary Examiner.*

T. G. DAVIS, *Assistant Examiner.*

U.S. Cl. X.R.

117—138.8, 141, 145, 161; 260—29.2